(12) United States Patent
Cheng

(10) Patent No.: US 11,100,220 B2
(45) Date of Patent: *Aug. 24, 2021

(54) DATA TYPE RECOGNITION, MODEL TRAINING AND RISK RECOGNITION METHODS, APPARATUSES AND DEVICES

(71) Applicant: Advanced New Technologies Co., Ltd., Grand Cayman (KY)

(72) Inventor: Yu Cheng, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,663

(22) Filed: Jan. 28, 2020

(65) Prior Publication Data

US 2020/0167466 A1 May 28, 2020

Related U.S. Application Data

(63) Continuation of application No. 16/444,156, filed on Jun. 18, 2019, which is a continuation of application No. PCT/CN2018/091043, filed on Jun. 13, 2018.

(30) Foreign Application Priority Data

Jun. 16, 2017 (CN) .......................... 201710458652.3

(51) Int. Cl.
| | |
|---|---|
| *G06F 21/55* | (2013.01) |
| *G06N 20/00* | (2019.01) |
| *G06F 16/2458* | (2019.01) |
| *G06F 16/35* | (2019.01) |
| *G06Q 10/06* | (2012.01) |
| *G06K 9/62* | (2006.01) |

(52) U.S. Cl.
CPC ........ *G06F 21/552* (2013.01); *G06F 16/2465* (2019.01); *G06F 16/35* (2019.01);
(Continued)

(58) Field of Classification Search
CPC ...... G06N 20/00; G06K 9/6267; G06F 16/35; G06F 21/552; G06F 16/2465;
(Continued)

(56) References Cited

U.S. PATENT DOCUMENTS 9,306,966 B2 * 4/2016 Eskin ...................... G06F 16/84
9,985,984 B1 * 5/2018 Chavez ............... H04L 63/1441

FOREIGN PATENT DOCUMENTS

| CN | 101980202 A | 2/2011 |
|---|---|---|
| CN | 102176698 A | 9/2011 |

(Continued)

OTHER PUBLICATIONS

Written Opinion in Application No. 11201906380P, issued by the Intellectual Property Office of Singapore on May 26, 2020.
(Continued)

*Primary Examiner* — Ali S Abyaneh
(74) *Attorney, Agent, or Firm* — Finnegan, Henderson, Farabow, Garrett & Dunner, LLP

(57) ABSTRACT

Data type recognition and model training methods and apparatuses, and computer devices are provided. The model training method includes acquiring a first sample data set, and using the first sample data set to train an anomaly detection model; and detecting an abnormal sample data set from a second sample data set by means of the anomaly detection model, and using the abnormal sample data set to train a classification model. By using this method, an amount of scoring events of the classification model can be reduced, and relatively balanced sample data sets can also be provided for training, to obtain the classification model with a higher accuracy.

12 Claims, 9 Drawing Sheets

(52) U.S. Cl.
CPC ........... *G06K 9/6267* (2013.01); *G06N 20/00* (2019.01); *G06Q 10/0635* (2013.01); *G06F 2221/034* (2013.01)

(58) Field of Classification Search
CPC ....... G06F 2221/0347; H04L 29/06877; H04L 63/14; H04L 63/1441; G06Q 10/0635
See application file for complete search history.

(56) References Cited

FOREIGN PATENT DOCUMENTS

| | | |
|---|---|---|
| CN | 104794192 A | 7/2015 |
| CN | 105279382 A | 1/2016 |
| CN | 105760889 A | 7/2016 |
| CN | 106296195 A | 1/2017 |
| CN | 106503562 A | 3/2017 |
| WO | WO 2016/138041 A2 | 9/2016 |

OTHER PUBLICATIONS

International Search Report in International Application No. PCT/CN2018/091043, dated Sep. 12, 2018.
Notice of Eligibility for Grant and Examination Report in Application No. 11201906380P, issued by the Intellectual Property Office of Singapore dated May 10, 2021.
Examination Report in Indian Application No. 201917027310, dated Jun. 21, 2021.

\* cited by examiner

DATA TYPE RECOGNITION, MODEL TRAINING AND RISK RECOGNITION METHODS, APPARATUSES AND DEVICES

CROSS-REFERENCE TO RELATED APPLICATIONS

This application is a continuation application of U.S. application Ser. No. 16/444,156, filed on Jun. 18, 2019, which is a continuation application of International Application No. PCT/CN2018/091043, filed on Jun. 13, 2018, which is based upon and claims priority to Chinese Patent Application No. 201710458652.3, filed on Jun. 16, 2017, the entire content of all of which is incorporated herein by reference.

TECHNICAL FIELD

The present application relates to the technical field of computer technologies, and in particular to data type recognition, model training and risk recognition methods, apparatuses and devices.

TECHNICAL BACKGROUND

In the field of computer technologies, a type of data often needs to be recognized, for example, recognizing whether user account is stolen, recognizing whether a transaction risky transaction, recognizing whether a user behavior is a fraudulent behavior, etc. In the relevant art, black and white samples are usually determined according to historical data, wherein the white samples are a type of normal samples in the historical data, and the black samples are the other type of samples indicating events such as account theft, high-risk transactions or fraudulent behaviors in the historical data. After that, a classifier can be obtained by training with the black and white samples based on a classification algorithm.

However, in real life, with respect to normal events, the occurrence probability of events such as account theft, high-risk transactions or fraudulent behaviors is low; therefore, the black and white samples may be seriously unbalanced in most scenarios, and the proportion of the black samples in total samples is low. Great challenges will therefore be brought to the training of a classifier, and the accuracy of recognition of the classifier may be low.

SUMMARY

In order to overcome the problems existing in the relevant art, embodiments of the specification provide data type recognition, model training and risk recognition methods, apparatuses and devices.

According to one aspect, a data type recognition method for recognizing data as first-type data or second-type data comprises: acquiring data to be recognized, and using a preset anomaly detection model to detect whether the data to be recognized is first-type data; and inputting other data than the first-type data recognized by the anomaly detection model, into a classification model for recognition, wherein the classification model classifies the other data as first-type data and second-type data.

According to another aspect, a model training method for training an anomaly detection model and a classification model is provided. The anomaly detection model is configured to detect input data as first-type data, and the classification model is configured to classify other data than the first-type data detected by the anomaly detection model. The method comprises: training the anomaly detection model by: acquiring a first sample data set, wherein an amount of first-type data in the first sample data set is greater than that of second-type data; and using the first sample data set to train the anomaly detection model; and training the classification model by: detecting, by the anomaly detection model, an abnormal sample data set from a second sample data set, and using the abnormal sample data set to train the classification model.

According to still another aspect, a risk recognition method for recognizing data as secure data or risky data comprises: acquiring data to be recognized, and using a preset anomaly detection model to detect whether the data to be recognized is abnormal data; if the data to be recognized is detected not to be abnormal, determining that the data to be recognized is secure data; and if the data to be recognized is detected to be abnormal, using a preset classification model to recognize that the data to be recognized is secure data or risky data, wherein the classification model is obtained by pre-training with an abnormal sample data set recognized by the anomaly detection model.

According to yet another aspect, a computer device comprises: a processor; and a memory for storing a processor executable instruction, wherein the processor is configured to: acquire data to be recognized, and use a preset anomaly detection model to detect whether the data to be recognized is first-type data; and input other data than the first-type data recognized by the anomaly detection model, into a classification model for recognition, wherein the classification model classifies the other data as first-type data and second-type data.

According to yet another aspect, a computer device comprises: a processor; and a memory for storing a processor executable instruction, wherein the processor is configured to: train the anomaly detection model by: acquiring a first sample data set, wherein an amount of first-type data in the first sample data set is greater than that of second-type data; and using the first sample data set to train the anomaly detection model; and train the classification model by: detecting, by the anomaly detection model, an abnormal sample data set from a second sample data set, and using the abnormal sample data set to train the classification model.

According to yet another aspect, a computer device comprises: a processor; and a memory for storing a processor executable instruction, wherein the processor is configured to: acquire data to be recognized, and using a preset anomaly detection model to detect whether the data to be recognized is abnormal data; if the data to be recognized is detected not to be abnormal, determine that the data to be recognized is secure data; and if the data to be recognized is detected to be abnormal, use a preset classification model to recognize that the data to be recognized is secure data or risky data, wherein the classification model is obtained by pre-training with an abnormal sample data set recognized by the anomaly detection model.

The technical solutions provided by the embodiments of the specification can have the following beneficial effects:

In the embodiments, in a training process, an anomaly detection model is firstly obtained by training with a first sample data set; based on this, an abnormal sample data set can be screened out from a full second sample data set. Since a classification model is obtained by training with an abnormal sample data set recognized by the anomaly detection model, most first-type data can be eliminated for the classification model to quickly distinguish samples that are abnormal compared to most samples; and the remaining abnormal samples may contain most second-type data, and some first-type data. After that, the classification model is trained with the abnormal samples. Not only the amount of scoring events for the final classification model is reduced, but also relatively balanced sample data sets can be provided for training the classification model. Since the proportion of first-type data and second-type data in the abnormal sample data set are relatively balanced, a classification model with higher accuracy can be obtained by training, and thus the data recognition capability can be improved by combining the two parts. During a particular application, an anomaly detection model and a classification model can be deployed online; and data to be recognized is firstly input to the anomaly detection model, so that whether the data to be recognized is abnormal can be quickly distinguished; if yes, then the data is further classified by the classification model.

It should be understood that the general description above and detail description later are merely exemplary and explanatory, and do not limit the specification.

BRIEF DESCRIPTION OF THE DRAWINGS

The accompanying drawings are incorporated into the description and constitute a part of the present description, and together with the description, illustrate embodiments and explain the principle disclosed in the specification.

DETAILED DESCRIPTION OF EMBODIMENTS

Figure 1A:
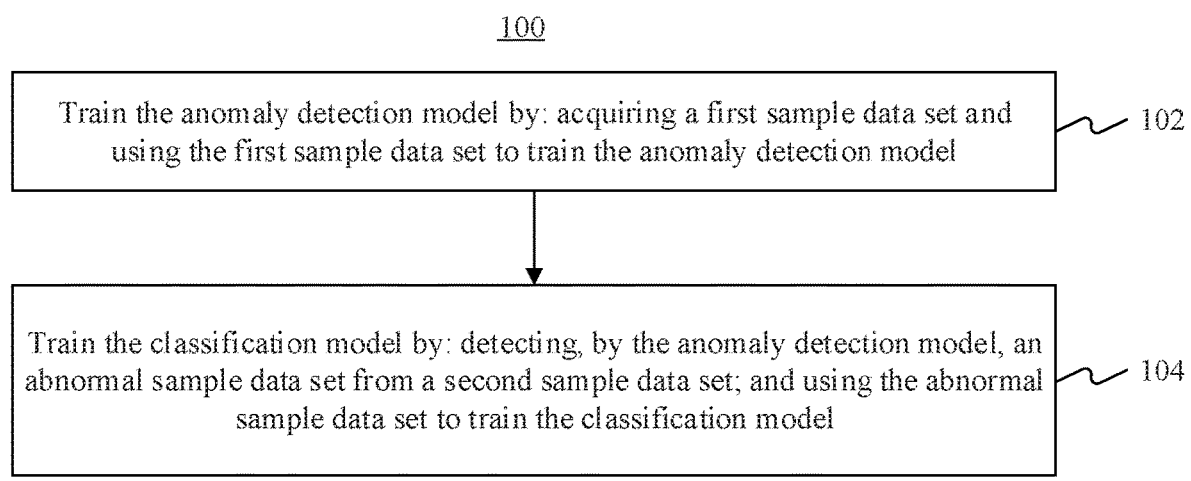
FIG. 1A shows a schematic diagram of a model training method according to an exemplary embodiment.

Exemplary embodiments will be described in detail herein, and examples thereof are illustrated in the accompanying drawings. When the description below refers to the accompanying drawings, the same numbers denote the same or similar elements in different accompanying drawings, unless otherwise indicated. The implementations described in the exemplary embodiments below do not represent all the implementations consistent with the present application. On the contrary, they are merely examples of apparatuses and methods consistent with some aspects of the present application as detailed in the appended claims.

Terms used in the specification are only for the purpose of describing specific embodiments, and are not intended to restrict the present application. Singular forms "a(an)", "the", and "this" used in the present application and the appended claims are also intended to include plural forms, unless other meaning is clearly indicated in the context. It should also be understood that the term "and/or" used herein refers to and contains any or all possible combinations of one or more of the associated listed items.

It should be understood that, although terms "first", "second", "third", etc., may be used to describe various information in the specification, these pieces of information should not be limited by these terms. These terms are merely used to distinguish information of the same type from one another. By way of example, without departing from the scope of the present application, first information can also be referred to as second information, and similarly second information can also be referred to as first information. Depending on the context, the word "if" as used herein can be explained as "when" or "at the time of" or "in response to a determination".

In the field of computer technologies, a type of data often needs to be recognized, for example, recognizing whether there is a user account theft, recognizing whether a transaction is a risky transaction, recognizing whether a user behavior is a fraudulent behavior, etc.

For example, risk recognition is an important constituent part of a risk control system, and is a primary basis source for risk decisions. With the popularization and progress of machine learning and data mining technologies, using a model for risk recognition has become a trend. Typical risk recognition with a model is to utilize a supervised learning algorithm to build a model and model variables according to historical behaviors and service experience knowledge, and then train the model with black and white samples. For example, the white samples are a type of normal samples in historical data, and the black samples are a type of abnormal samples in historical data that indicate events such as account theft, high-risk transactions or fraudulent behaviors in the historical data. Finally, the trained model is deployed online, so as to discriminate risks in real time. Such schemes are not only more precise but also are more difficult to be broken compared to rule-based traditional recognition, but problems and challenges may still exist.

On the one hand, black and white samples may be seriously unbalanced in most scenarios. In real life, it can be considered in be secure or low-risk most of the time, so the amount of such normal data (white samples) is very large. In comparison, such data (black samples) of high-risk events only occupies a small proportion, such as $1/10^4$ or even a smaller proportion. Therefore, when determining samples with historical data, the black-to-white proportion of the samples may be seriously unbalanced. Though, in many solutions, the proportion of black samples in total training samples may be increased by techniques such as sampling and punishment, the challenges brought to classifiers by sample unbalance may not be fundamentally solved, and the accuracy of the trained classifier may not be guaranteed.

On the other hand, highly concurrent and massive online data constantly raises higher requirements for the performance of classifiers. An online model should recognize a risk within a short time, such as within 200 ms, otherwise the stability of the system and user experience may be affected. Risk situations and user experience are bringing more challenges to the precision and performance of quick recognition.

In view of the above, embodiments of the specification provide a model training method. Based on the model training method, an anomaly detection model and a classification model can be trained, wherein the anomaly detection model is configured to recognize first-type data by detecting whether input data is abnormal, and the classification model is configured to classify other data than the first-type data recognized by the anomaly detection model. The classification model is obtained by training with an abnormal sample data set recognized by the anomaly detection model. The anomaly detection model can eliminate most first-type data and can quickly distinguish samples that are abnormal compared to most samples; and the remaining abnormal samples may include most second-type data, and some first-type data. After that, the classification model is trained with the abnormal samples. Not only the amount of scoring events for the final classification model can be reduced, but also relatively balanced sample data sets a be provided for training the classification model. Since the proportion of first-type data and second-type data in the abnormal sample data set are relatively balanced, a classification model with higher accuracy can be obtained by training, and thus the data recognition capability can be improved by combining the two parts. In one embodiment, an anomaly detection model and a classification model can be deployed online; and data to be recognized is firstly input to the anomaly detection model, so that whether the data to be recognized is abnormal can be quickly distinguished, and abnormal data is further accurately classified by the classification model.

FIG. 1A is a schematic diagram of a model training method 100 according to an exemplary embodiment. The model training method 100 is used for training an anomaly detection model and a classification model. The anomaly detection model may detect whether input data is abnormal, so as to detect first-type data; and the classification model may classify other data than the first-type data detected by the anomaly detection model. Referring to FIG. 1A, the method 100 includes the following steps:

In step 102, the anomaly detection model is trained by: acquiring a first sample data set, wherein an amount of first-type data in the first sample data set is greater than that of second-type data; and using the first sample data set to train the anomaly detection model.

In step 104, the classification model is trained by: detecting, by the anomaly detection model, an abnormal sample data set from a second sample data set, and using the abnormal sample data set to train the classification model.

In the embodiments of the specification, the first-type data and the second-type data are used to distinguish data types, wherein the first-type data refers to a type of data having a larger amount, and the second-type data refers to a type of data having a smaller amount. Under different scenarios, the first-type data and the second-type data can represent different types of data in an application scenario according to the requirement of a particular scenario. For example, in a risk recognition scenario, the amount of low risk secure data is large; and because the occurrence probability of high risks is low, the amount of high-risk data is small. Therefore, the first-type data can refer to low-risk secure data, and the second-type data can refer to high-risk data. Also for example, in an account theft scenario, the amount of normal behavior data is large; and because the occurrence probability of account theft is low, the amount of high-risk data is small. Therefore, the first-type data can refer to normal behavior data, and the second-type data can refer to account theft behavior data. In practical application, this can be flexibly determined according to particular scenarios.

In the process of model training, an anomaly detection model is trained first. For example, a historical data set can be acquired, and the historical data set contains first-type data and second-type data. Further, a feature set including multiple features can be chosen based on service experience; each combination of features represents a characteristic of each pieces of data; and appropriate features can be chosen according to service demands in different application scenarios. For example, in the risk recognition scenario, a feature set can include a historical number of payment days, a payment amount, a payment time, features of a payment device, a user's usage habit, etc. By means of the feature set, each piece of data in the historical data set can be converted into corresponding sample data represented by each feature vector, so as to obtain a sample data set. In this embodiment, for distinction, the sample data set for training an anomaly detection model is referred to as a first sample data set.

Next, the anomaly detection model is trained with the first sample data set. For example, an initialized anomaly detection model can be determined based on an anomaly detection algorithm, and training is carried out with the first sample data set, to obtain parameter values in the anomaly detection model. In practical application, the anomaly detection algorithm can be flexibly chosen as required, for example, a support vector clustering machine, an isolation tree algorithm, etc.

Figure 1B:
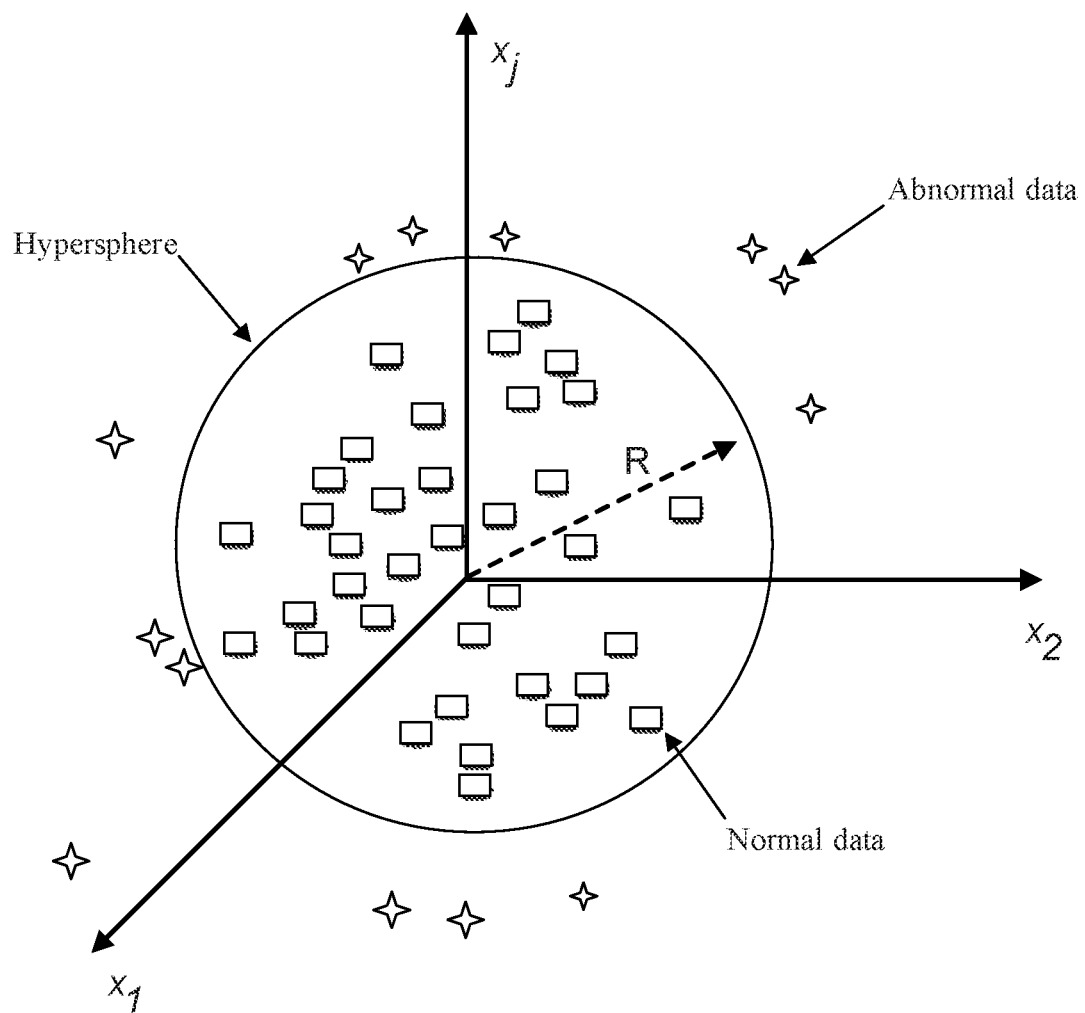
FIG. 1B shows a schematic diagram of anomaly detection according to an exemplary embodiment.

Taking the support vector clustering machine as an example, support vector clustering is a non-supervised anomaly detection method; and the method can map samples in complex dimensions into a high-dimension space, so that the samples can gather in one region as far as possible. FIG. 1B is a schematic diagram of anomaly detection according to an exemplary embodiment. In FIG. 1B, the circle represents a hypersphere, data enclosed within the hypersphere represents normal data and is denoted by rectangles, and data outside the hypersphere is abnormal data and is denoted by stars. In this embodiment, individuals, the patterns of which are more similar to each other, are closer to each other and are closer to the center of the hypersphere, and individuals, the patterns of which are abnormal or different, will be far away from the center. Therefore, the hypersphere can be formed in a mapped high-dimension space so as to enclose sample data, so that as much sample data as possible is enclosed inside the hypersphere, and the remaining samples outside the hypersphere can be considered as abnormal data. In a practical usage process, the constraint of the radius (R) of the hypersphere can be determined as required, and it only needs to ensure that normal samples, which are first-type data having a large data amount, are enclosed in the sphere; and abnormal samples outside the sphere have a low similarity with the normal samples, and may be first-type data and may also be second-type data. The specific abnormal data selection proportion or the capture force of an abnormal pattern can be indicated by an output score of a support vector clustering machine; and according to a practical application scenario, an appropriate size can be obtained by training with a sample data set.

In this embodiment, when an anomaly detection model is trained and is deployed for application, a full sample data set can pass through the anomaly detection model, and an abnormal sample data set therein can be screened out by the anomaly detection model, and the abnormal sample data set can be used for training a classification model. Next, the process of training a classification model is described.

Like the process of training an anomaly detection model, the training of a classification model also needs a sample data set. In this embodiment, a sample data set for training a classification model is referred to as a second sample data set. In practical application, the second sample data set may be different from the first sample data set, and may also be the same sample data set.

In training, an abnormal sample data set can be screened out by the anomaly detection model from the full second sample data set. The input sample data set is not the full set when training the classification model, a large amount of normal first-type data is eliminated, and the remaining part includes abnormal samples which may be first-type data and may also be second-type data. Therefore, the black and white sample data are relatively balanced, improving the consistency of model training and application. After that, the classification model can be trained with the abnormal sample data set. For example, an initialized classification model can determined based on a classification algorithm, and training is carried out with the abnormal sample data set to obtain parameter values in the classification model. The classification algorithm can be flexibly chosen as required in practical application, for example, a decision tree, a Bayesian classification algorithm, an artificial neural network, a K-nearest neighbor algorithm or a random forest classification algorithm.

After an abnormal sample data set is screened out using the anomaly detection model, since the features of the abnormal sample data set are features in the above-described feature set, in consideration that the proportion of the first-type data and the second-type data are relatively balanced at this time, the features may be optimized, so as to increase the training speed. In an embodiment, before using the abnormal sample data set to train the classification model, the method further includes optimizing the abnormal sample data set based on a feature optimization algorithm.

In this embodiment, since samples are relatively balanced, a feature optimization algorithm can be used to optimize all the features in an abnormal sample data set, so as to choose a better feature subset and obtain an optimized abnormal sample data set. For example, a genetic algorithm can be used for optimization. By way of example, binary encoding is performed on all the features, wherein 1 indicates choosing to enter the model, and 0 indicates refusing to enter the model; an output score of the model can be used to balance a number of model-entering variables in a fitness function, for example, using a Bayesian Information Criterion (BIC), etc., and the feature optimization algorithm can be flexibly chosen as required in practical application.

Figure 2:
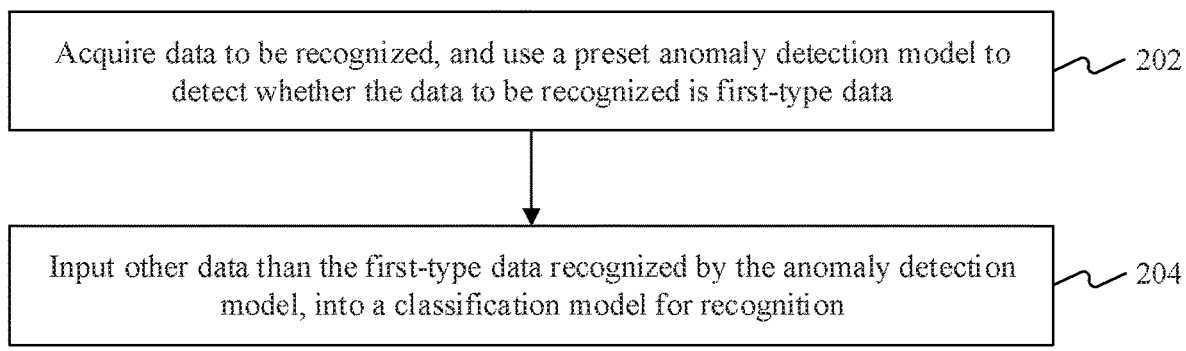
FIG. 2 shows a schematic diagram of a data type recognition method according to an exemplary embodiment.

The above-mentioned process relates to a model training process, and the application process of a model put online is described next. FIG. 2 is a schematic diagram of a data type recognition method 200 according to an exemplary embodiment. The method 200 can be used for recognizing data as first-type data or second-type data, and includes the following steps.

In step 202, data to be recognized is acquired, and a preset anomaly detection model is used to detect whether the data to be recognized is first-type data.

In step 204, other data than the first-type data recognized by the anomaly detection model, is input into a classification model for recognition, wherein the classification model classifies the other data as first-type data and second-type data.

It can be seen from the aforementioned model training process that the anomaly detection model detects whether input data is abnormal, and the classification model recognizes input abnormal data as first-type data or second-type data. Therefore, in this embodiment, when the type of data needs to be recognized, data to be recognized can be acquired, wherein the data to be recognized has features required by the anomaly detection model when performing detection. According to the features of the data to be recognized, the anomaly detection model is firstly used to detect whether the data to be recognized is abnormal; if the data to be recognized is detected not to be abnormal, the data to be recognized is determined as first-type data (e.g., secure data); and if the data to be recognized is detected to be abnormal, then a preset classification model is further used to recognize that the data to be recognized is first-type data (e.g., low-risk and therefore secure data) or second-type data (e.g., high-risk and therefore risky data).

The anomaly detection model is obtained by pre-training, which includes acquiring a first sample data set, wherein an amount of first-type data in the first sample data set is greater than that of second-type data; and using the first sample data set to train the anomaly detection model.

The classification model is obtained by pre-training, which includes: detecting, by the anomaly detection model, an abnormal sample data set from a second sample data set; and using the abnormal sample data set to train the classification model.

In an embodiment, before using the abnormal sample data set to train the classification model, the method further comprises: optimizing abnormal sample data set based on a feature optimization algorithm.

For the method of training the above-mentioned two models, reference can be made to the description of the embodiment shown in FIG. 1A, which will not be elaborated here.

Figure 3A:
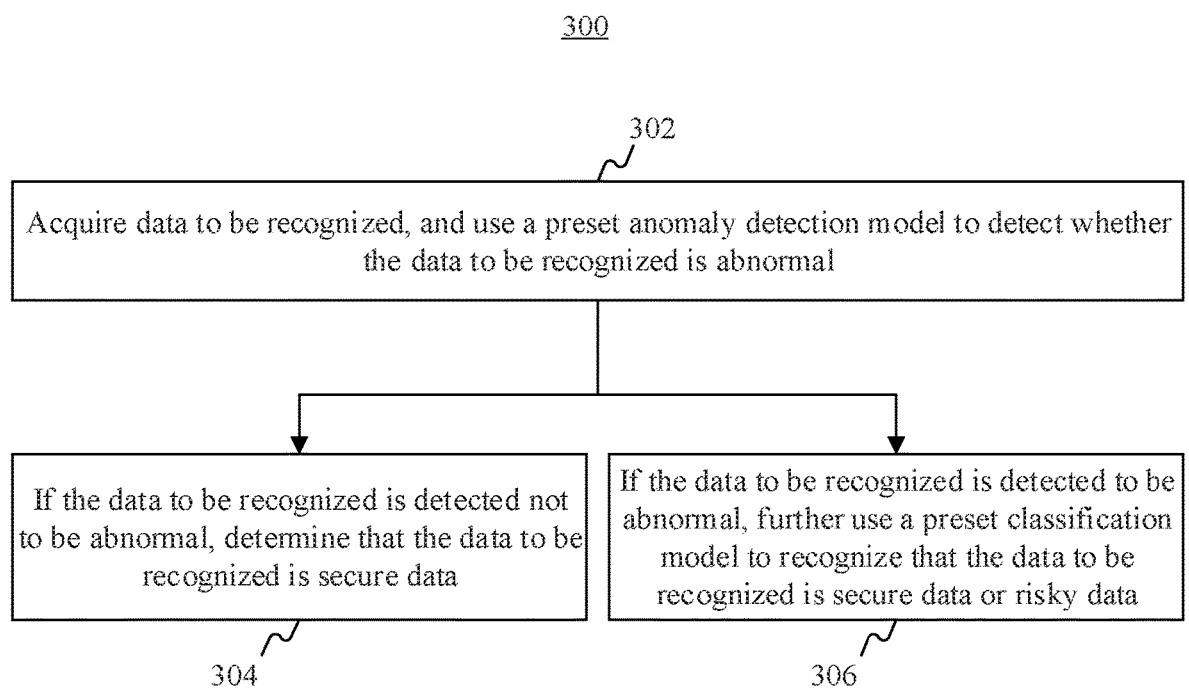
FIG. 3A shows a schematic diagram of a risk recognition method according to an exemplary embodiment.

Next, embodiments will be described in detail by taking a risk recognition scenario as an example. FIG. 3A is a risk cognition method 300 according to an exemplary embodiment. The method 300 can recognize data as secure data or risky data, and includes the following steps.

In step 302, data to be recognized is acquired, and a preset anomaly detection model is used to detect whether the data to be recognized is abnormal.

In step 304, if die data to be recognized is detected not to be abnormal, the data to be recognized is determined as secure data.

In step 306, if the data to be recognized is detected to be abnormal, a preset classification model is further used to recognize that the data to be recognized is secure data or risky data, wherein the classification model is obtained by pre-training with an abnormal sample data set recognized by the anomaly detection model.

Figure 3B:
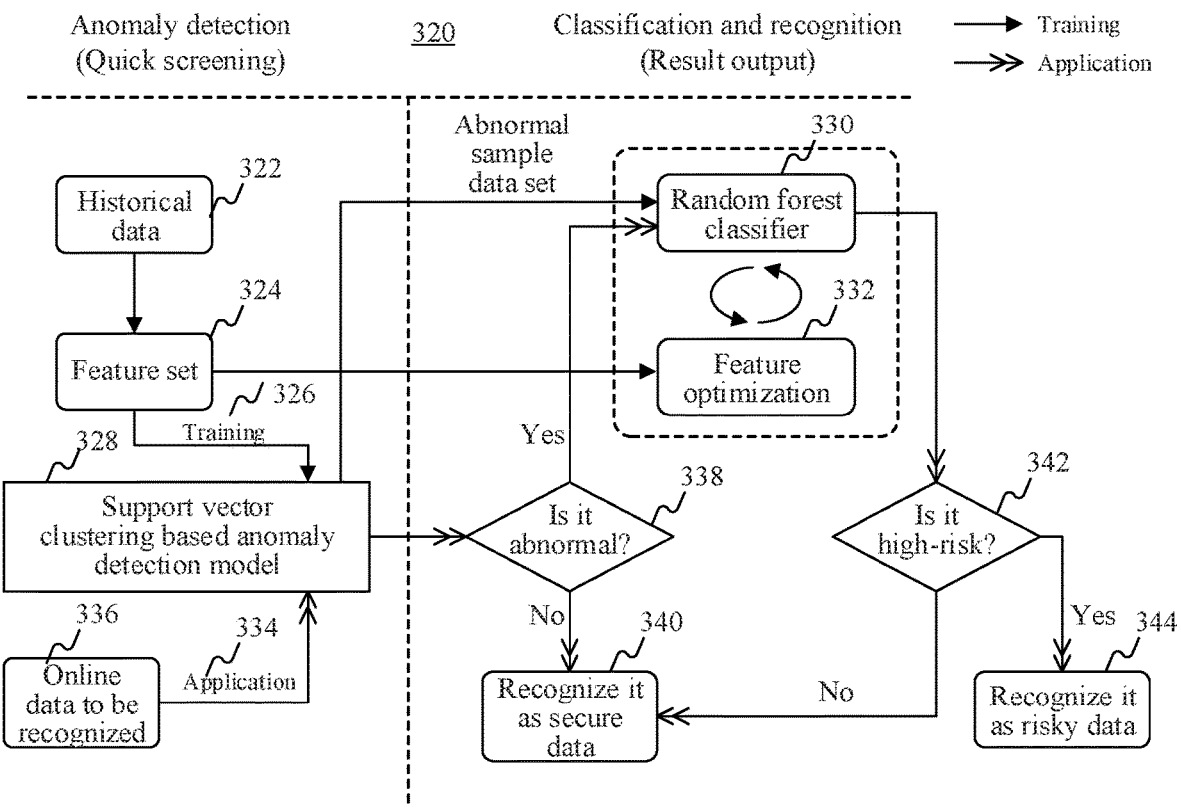
FIG. 3B shows a schematic diagram of an application scenario of a model training and risk recognition method according to an exemplary embodiment.

FIG. 3B is a schematic diagram of an application scenario of a model training and risk recognition method 320 according to an exemplary embodiment. In this embodiment, a risk recognition system combining anomaly detection model and a classification model can be built, for carrying out risk recognition on input data, so as to recognize whether the input data is low-risk normal data or risky data. The method 320 involves anomaly detection, feature optimization, and supervised classification learning. In practical application, multiple algorithms can be used in the above-mentioned three processes. In this embodiment, description is made by taking support vector clustering as an example of anomaly detection, taking a genetic algorithm as an example of feature optimization, and taking a random forest as an example of supervised classification learning.

Referring to FIG. 3B, a training process in the method 320 includes acquiring historical data (322), wherein a feature set is firstly selected based on a service scenario to indicate risks (324), such as a historical number of payment days, features of a payment device and a user's usage habit; and determining a sample data set including black and white samples according to the historical data. The training process also includes using the sample data set to train a set anomaly detection model (326). In this embodiment, for anomaly detection, a support vector clustering machine is taken as an example, and a sample data set is input into the support vector clustering machine (328) for learning. Support vector clustering is a non-supervised anomaly detection method, and can map samples in complex dimensions into a high-dimension space, so that the samples can gather in one region as far as possible. Gathered data is considered normal first-type data having a large data amount, and data not gathered in a central region is considered abnormal data.

As described above in FIG. 1B, individuals, the patterns of which are more similar to each other, are closer to each other and are closer to the center of the coordinates, and individuals, the patterns of which are abnormal or different, will be far away from the center. Therefore, a hypersphere can be formed in a mapped high-dimension space so as to enclose samples, so that as many samples as possible are enclosed inside the hypersphere, and the remaining samples outside the hypersphere can be considered as abnormal points. In a practical usage process, the constraint of the radius (R) of the hypersphere can be flexibly set as required, and it only needs to ensure that normal samples are enclosed in the sphere; and an abnormal sample set outside the sphere may include real high-risk samples and some low-risk samples. Therefore, when the model is trained and is deployed online for application, after the full amount of samples passes through the model, samples that are not abnormal are directly recognized as low-risk, and abnormal samples are input into a next stage for further analysis and discrimination. The specific abnormal data selection proportion or the capture force of an abnormal pattern can be indicated by an output score of a support vector clustering machine; and according to a practical application scenario, an appropriate size can be obtained by training with a sample data set.

An anomaly detection model is used to detect an initial sample data set, and a detected abnormal sample data set can be used to train a classification model. In this embodiment, a random forest classifier is taken as an example of the classification model, and the abnormal sample data set can be input into the random forest classifier for training (330). Before training the classification model, since the input samples are not the full amount, the black and white samples are relatively balanced, improving the consistency of model training and application. At this time, a feature optimization algorithm can be used to optimize a feature set (332), so as to choose a better feature set. For example, a genetic algorithm can be used for optimization. By way of example, binary encoding is performed on all the features, wherein 1 indicates choosing to enter the model, and 0 indicates refusing to enter the model; an output score of the model is used to balance a number of model-entering variables in a fitness function, for example, using the Bayesian Information Criterion (BIC).

The method 320 also includes an application process. During a particular application (334), data to be recognized can be acquired (336), and according to features of the data to be recognized, whether the data to be recognized is abnormal can be firstly detected using the anomaly detection model (338); and if detected not to be abnormal, the data to be recognized is determined as low-risk secure data (340); and if the data to be recognized is detected to be abnormal, the preset classification model (330) is used to further recognize (342) that the data to be recognized is low-risk secure data (340) or high-risk and therefore risky data (344).

Corresponding to the aforementioned embodiments of data type recognition, model training and risk recognition methods, embodiments of the specification also provide a data type recognition apparatus, a model training apparatus, a risk recognition apparatus and computer devices.

Figure 4:
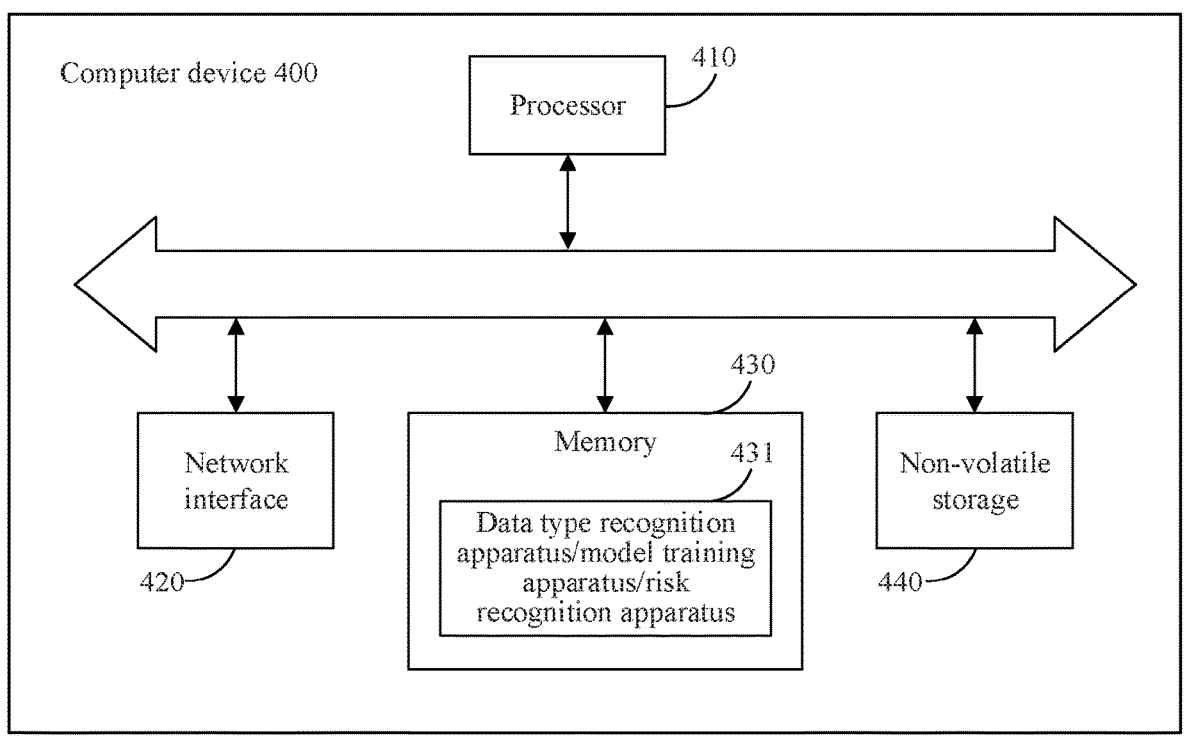
FIG. 4 shows a block diagram of a computer device according to an exemplary embodiment.

FIG. 4 is a block diagram of a computer device 400, according to an exemplary embodiment. For example, the computer device 400 may implement any of the below described data type recognition apparatus/model training apparatus/risk recognition apparatus. The device 400 may include a processor 410, a memory 430, a network interface 420, and a non-volatile storage 440.

The processor 410 may include one or more dedicated processing units, application-specific integrated circuits (ASICs), field-programmable gate arrays (FPGAs), or various other types of processors or processing units. The processor 410 is coupled with the memory 430 and is configured to execute instructions stored in the memory 430 to perform the above described methods.

The memory 430 may include a non-permanent memory, a random access memory (RAM) and/or a non-volatile memory (such as a read-only memory (ROM) or a flash memory (flash RAM)), etc. For example, the memory 430 stores instructions to perform the above described methods, to implement apparatuses 431, which may further include other hardware according to actual functions of the computer device 430.

In an embodiment, the processor 410 is configured to: acquire data to be recognized, and use a preset anomaly detection model to detect whether the data to be recognized is first-type data; and input other data than the first-type data recognized by the anomaly detection model, into a classification model for recognition, wherein the classification model classifies the other data as first-type data and second-type data.

In an embodiment, the processor 410 is configured to: train the anomaly detection model by: acquiring a first sample data set, wherein an amount of first-type data in the first sample data set is greater than that of second-type data; and determining an initialized anomaly detection model based on an anomaly detection algorithm, and training with the first sample data set to obtain parameter values in the anomaly detection model; and train the classification model by: detecting, by the anomaly detection model, an abnormal sample data set from a second sample data set; and determining an initialized classification model based on a classification algorithm, and training with the abnormal sample data set to obtain parameter values in the classification model.

In an embodiment, the processor 410 is configured to: acquire data to be recognized, and use a preset anomaly detection model to detect whether the data to be recognized is abnormal data; and if the data to be recognized is detected not to be abnormal, determine that the data to be recognized is secure data, and if the data to be recognized is detected to be abnormal, use a preset classification model to recognize that the data to be recognized is secure data or risky data, wherein the classification model is obtained by pre-training with an abnormal sample data set recognized by the anomaly detection model.

Figure 5:
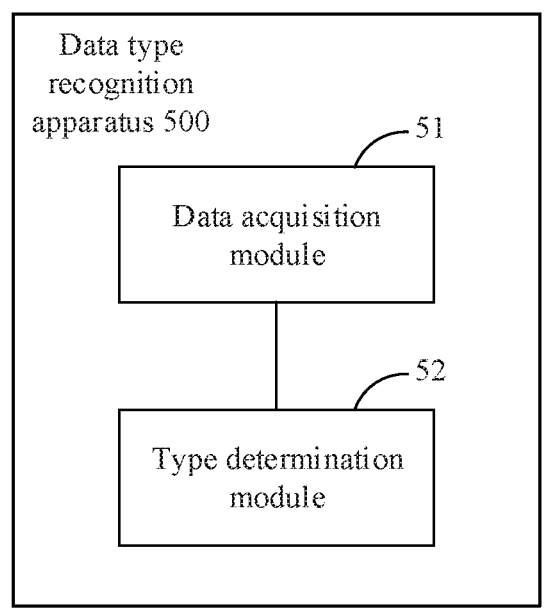
FIG. 5 shows a block diagram of a data type recognition apparatus according to exemplary embodiment.

FIG. 5 is a block diagram of a data type recognition apparatus 500 according to an exemplary embodiment. For example, the apparatus 500 is configured to recognize data as first-type data or second-type data. The apparatus 500 includes: a data acquisition module 51 for acquiring data to be recognized, and using a preset anomaly detection model to detect whether the data to be recognized is first-type data; and a type determination module 52 for inputting other data than the first-type data recognized by the anomaly detection model, into a classification model for recognition, wherein the classification model classifies the other data as first-type data and second-type data.

In some embodiments, the apparatus 500 further includes an anomaly detection model training module (not shown) for acquiring a first sample data set, wherein an amount of first-type data in the first sample data set is greater than that of second-type data; and using the first sample data set to train the anomaly detection model.

In some embodiments, the apparatus 500 further includes a classification model training module (not shown) for detecting, by the anomaly detection model, an abnormal sample data set from a second sample data set, and using the abnormal sample data set to train the classification model.

In some embodiments, the apparatus 500 further includes an optimization module for optimizing the abnormal sample data set based on a feature optimization algorithm before using the abnormal sample data set to train the classification model.

Figure 6:
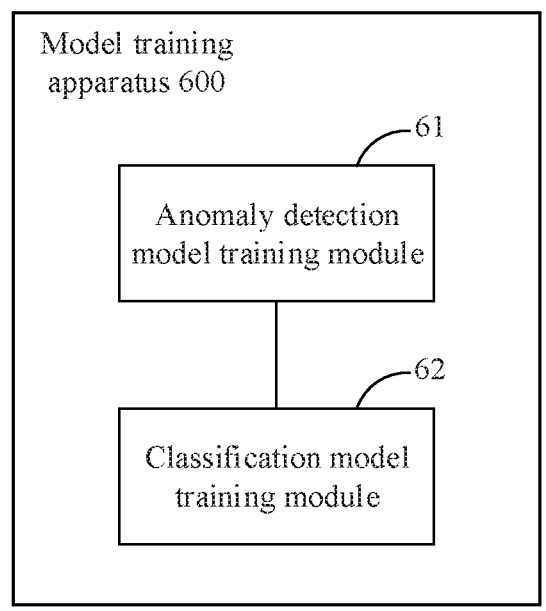
FIG. 6 shows a block diagram of a model training apparatus according to an exemplary embodiment.

FIG. 6 is a block diagram of a model training apparatus 600 according to an exemplary embodiment. For example, the apparatus 600 is used for training an anomaly detection model and a classification model, the anomaly detection model being configured to detect first-type data, and the classification model being configured to classify other data than the first-type data detected by the anomaly detection model. The apparatus 600 includes: an anomaly detection model training module 61 for acquiring a first sample data set, wherein an amount of first-type data in the first sample data set is greater than that of second-type data; and using the first sample data set to train the anomaly detection model; and a classification model training module 62 for detecting, by the anomaly detection model, an abnormal sample data set from a second sample data set, and using the abnormal sample data set to train the classification model.

In some embodiments, the apparatus 600 further includes an optimization module (not shown) for optimizing the abnormal sample data set based on a feature optimization algorithm before using the abnormal sample data set to train the classification model.

Figure 7:
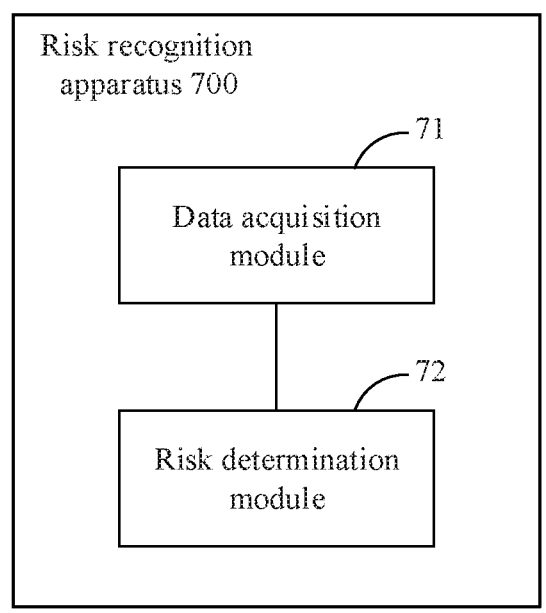
FIG. 7 shows a block diagram of a risk recognition apparatus according to an exemplary embodiment.

FIG. 7 is a block diagram of a risk recognition apparatus 700 according to an exemplary embodiment. For example, the apparatus 700 includes: a data acquisition module 71 for acquiring data to be recognized, and using a preset anomaly detection model to detect whether the data to be recognized is abnormal; and a risk determination module 72 for, if the data to be recognized is detected not to be abnormal, determining that the data to be recognized is secure data; and if the data to be recognized is detected to be abnormal, using a preset classification model to recognize that the data to be recognized is secure data or risky data, wherein the classification model is obtained by pre-training with an abnormal sample data set recognized by the anomaly detection model.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods.

For specific details of the process of implementing the function and role of each module in the above-mentioned apparatus, please refer to the process of implementing corresponding steps in the method mentioned above, which will not be elaborated.

For the apparatus embodiments, since they substantially correspond to the method embodiments, the description for the part of the method embodiments can be referred to for any additional detail. The apparatus embodiments described above are merely illustrative, wherein the modules described as separate components may or may not be physically separated; and components displayed as modules may or may not be physical modules, i.e., can either be at the same place or be distributed on multiple network modules. The purpose of the solutions of the present application can be realized by choosing some or all of the modules according to actual requirements.

In some embodiments, there is provided a computer program product, such as a non-transitory computer-readable storage medium having computer-readable program instructions thereon for causing a processor to carry out the above-described methods.

Those skilled in the art would easily conceive of other implementation solutions after contemplating the description and practicing the embodiments in the specification. The present application is intended to cover any variation, usage or adaptive change of the specification, and these variations, usage and adaptive changes follow the general principle of the specification and include common knowledge or customary technical means in the art not applied by the specification. The description and embodiments are only considered as exemplary, and the real scope and spirit of the specification is indicated by the appended claims.

It should be understood that the specification is not limited to the precise structure already described above and shown in the accompanying drawings, and various modifications and changes can be made thereto without departing from the scope of the specification. The scope of the specification is only restricted by the appended claims.

The invention claimed is:

1. A model training method for training an anomaly detection model and a classification model, comprising:
    training the anomaly detection model, wherein the anomaly detection model is a first machine learning model configured to detect data of a first type, and the anomaly detection model is trained by: acquiring a first sample data set, wherein an amount of data of the first type in the first sample data set is greater than an amount of data of a second type in the first sample data set; and using the first sample data set to train the anomaly detection model; and
    training the classification model, wherein the classification model is a second machine learning model configured to classify other data than the data of the first type detected by the anomaly detection model, and the classification model is trained by: detecting, by the anomaly detection model, an abnormal sample data set from a second sample data set; and using the abnormal sample data set to train the classification model.

2. The method according to claim 1, before using the abnormal sample data set to train the classification model, the method further comprising:
    optimizing the abnormal sample data set based on a feature optimization algorithm.

3. The method according to claim 1, further comprising:
    acquiring data to be recognized, and using the trained anomaly detection model to detect whether the data to be recognized is abnormal;
    if the data to be recognized is detected not to be abnormal, determining that the data to be recognized is secure data; and
    if the data to be recognized is detected to be abnormal, using the trained classification model to recognize that the data to be recognized is secure data or risky data.

4. The method according to claim 3, wherein an amount of secure data is greater than an amount of risky data in the first sample data set.

5. A computer device, comprising:
- a processor; and
- a memory for storing instructions executable by the processor,
- wherein the processor is configured to train an anomaly detection model and a classification model, the anomaly detection model being a first machine learning model configured to detect data of a first type, the classification model being a second machine learning model configured to classify other data than the data of the first type detected by the anomaly detection model;
- wherein in training the anomaly detection model, the processor is further configured to: acquire a first sample data set, an amount of data of the first type in the first sample data set being greater than an amount of data of a second type in the first sample data set; and use the first sample data set to train the anomaly detection model; and
- wherein in training the classification model, the processor is further configured to: detect, by the anomaly detection model, an abnormal sample data set from a second sample data set; and use the abnormal sample data set to train the classification model.

6. The computer device according to claim 5, wherein before using the abnormal sample data set to train the classification model, the processor is further configured to:
- optimize the abnormal sample data set based on a feature optimization algorithm.

7. The computer device according to claim 5, wherein the processor is further configured to:
- acquire data to be recognized, and use the trained anomaly detection model to detect whether the data to be recognized is abnormal;
- if the data to be recognized is detected not to be abnormal, determine that the data to be recognized is secure data; and
- if the data to be recognized is detected to be abnormal, use the trained classification model to recognize that the data to be recognized is secure data or risky data.

8. The computer device according to claim 7, wherein an amount of secure data is greater than an amount of risky data in the first sample data set.

9. A non-transitory computer-readable storage medium having stored therein instructions that, when executed by a processor of a computer device, cause the computer device to perform a model training method for training an anomaly detection model and a classification model, the method comprising:
- training the anomaly detection model, wherein the anomaly detection model is a first machine learning model configured to detect data of a first type, and the anomaly detection model is trained by: acquiring a first sample data set, wherein an amount of data of the first type in the first sample data set is greater than an amount of data of a second type in the first sample data set; and using the first sample data set to train the anomaly detection model; and
- training the classification model, wherein the classification model is a second machine learning model configured to classify other data than the data of the first type detected by the anomaly detection model, and the classification model is trained by: detecting, by the anomaly detection model, an abnormal sample data set from a second sample data set; and using the abnormal sample data set to train the classification model.

10. The non-transitory computer-readable storage medium according to claim 9, before using the abnormal sample data set to train the classification model, the method further comprising:
- optimizing the abnormal sample data set based on a feature optimization algorithm.

11. The non-transitory computer-readable storage medium according to claim 9, the method further comprising:
- acquiring data to be recognized, and using the trained anomaly detection model to detect whether the data to be recognized is abnormal;
- if the data to be recognized is detected not to be abnormal, determining that the data to be recognized is secure data; and
- if the data to be recognized is detected to be abnormal, using the trained classification model to recognize that the data to be recognized is secure data or risky data.

12. The non-transitory computer-readable storage medium according to claim 11, wherein an amount of secure data is greater than an amount of risky data in the first sample data set.

* * * * *